Nov. 29, 1938.  W. H. EDMONDSON  2,138,483
ELECTRIC MOTOR
Filed May 20, 1937
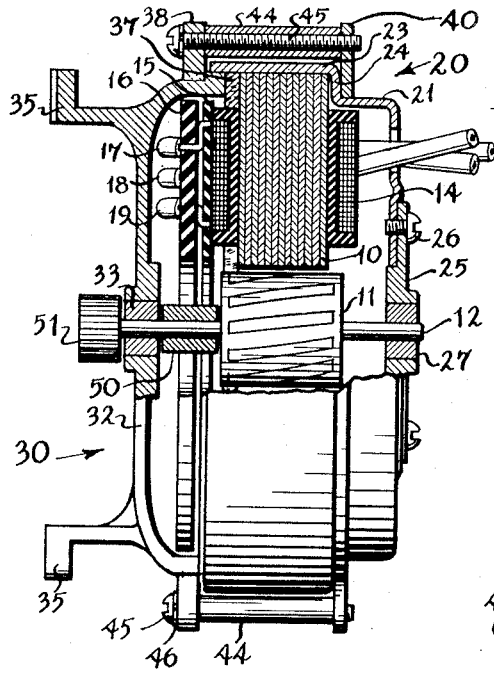
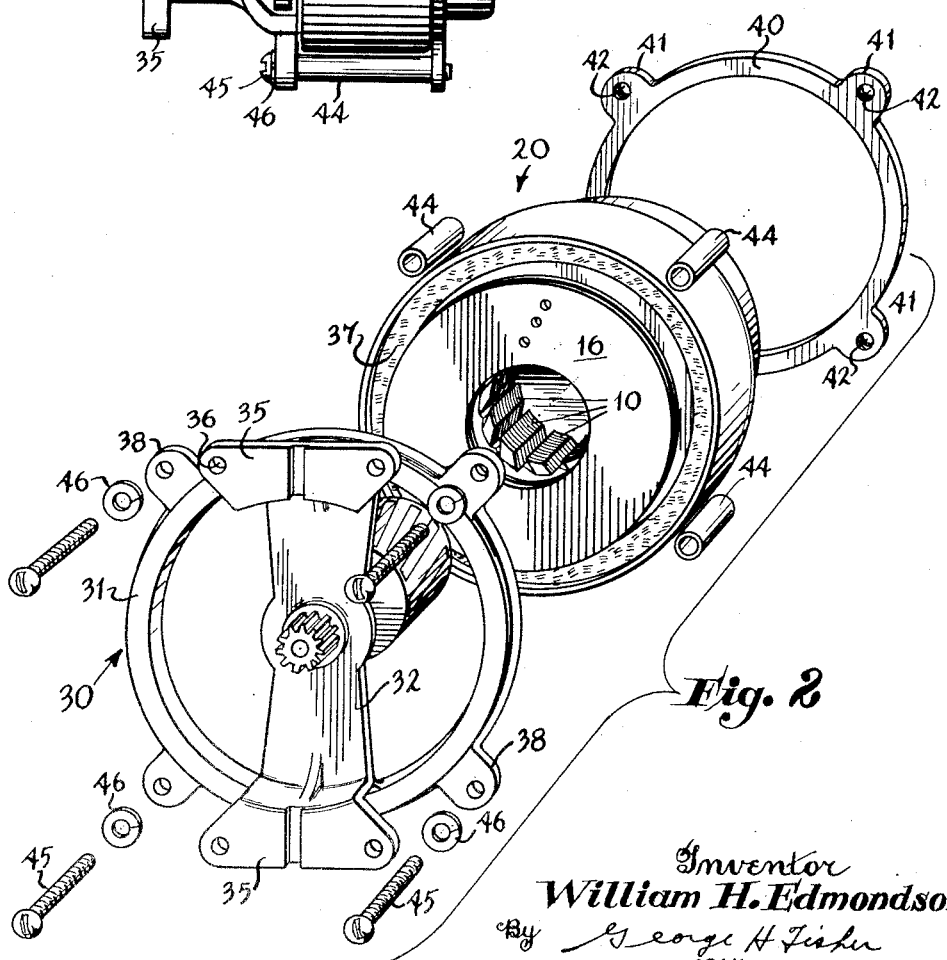
Inventor
William H. Edmondson
By George H. Fisher
Attorney Patented Nov. 29, 1938

2,138,483

UNITED STATES PATENT OFFICE 2,138,483

ELECTRIC MOTOR

William H. Edmondson, Oak Park, Ill., assignor to Minneapolis-Honeywell Regulator Company, Minneapolis, Minn., a corporation of Delaware Application May 20, 1937, Serial No. 143,769

12 Claims. (Cl. 171—252)

This present invention relates to improvements in an electric motor and more particularly to one in which a fixed amount of end play between the bearings is maintained.

It is generally desirable in the motor art to rigidly control the amount of end play permitted the rotor. A certain amount of end play must be permitted to allow for the expansion of materials; however, it is desirable that this be as small as possible. In the art of small electric motors, it is common practice to clamp the bearing supporting members against the laminated core, thus providing a relatively simple and inexpensive structure. The difficulty with this procedure is that the spacing of the bearing supporting members is determined by the thickness of the laminated core and it is difficult if not impossible to maintain this thickness entirely uniform due to the large number of constituent laminations. It has been proposed to provide a structure having relatively small end play, an arrangement in which fixed spacer members are interposed between the end plates, the fixed spacer members extending through the core, with lock washers interposed between the end plates and the core to yieldably hold the core in place without the thickness of the core effecting the spacing of the end plates. The present invention is concerned with an improvement in this type of motor.

An object of the present invention is to provide an improved electric motor in which the end bearing plates are spaced from each other regardless of the spacing of the core and in which the core is yieldably held in position by yieldable fibrous material which serves to reduce the motor vibration.

A further object is to provide an electric motor in which the bearings are located in telescoping casing members, one of which encloses the core and rotor assembly, the motor having fixed spacing means which determines the spacing of said casing members, and yieldable means interposed between the core and one of said casing members to cause said core to be yieldably held in position.

A further object of this invention is to provide a generally improved end casing structure, the details and advantages of which will be apparent from the specific structure thereof.

Other objects of the invention will be apparent from a consideration of the accompanying specification, claims and drawing.

In the drawing Figure 1 is a view partly in section of the improved electric motor of the present invention, and Figure 2 is an exploded view of the various elements of the electric motor.

Referring to the drawing, the field or stator core of the electric motor is designated by the reference numeral 10. This field core is provided in the customary manner with a circular opening in which a rotor 11 is positioned. The rotor 11 is of the customary "squirrel cage" type and its specific construction need not be explained. The rotor 11 is mounted upon a shaft 12.

The motor is of the multi-pole type and the field or stator score 10 comprises a plurality of pole portions as indicated in Figure 2. This core construction may be of any desired form although preferably taking the form shown in the copending application of Willis H. Gille, Serial No. 131,381, filed March 17, 1937. On each of the pole portions, a winding 14 is located. The wires from the various coils are led through a disc 15 of insulating material and the connections between the various coils are made on this disc. A second disc 16 also of insulating material is located adjacent the disc 15. The terminal conductors resulting from the various connections made on disc 15 are led through apertures in disc 16, the terminal conductors being designated by the reference numerals 17, 18 and 19 in the drawing.

Enclosing the field and rotor assembly is a cup shaped casing member 20. This member is preferably formed of sheet metal and as will be observed, can be formed by a single stamping operation. The casing meber 20 is stepped to provide a portion 21 of a relatively small diameter and a portion 23 of a relatively larger diameter. Between these two portions, a shoulder portion 24 is provided which results in an internal and an external shoulder. A bearing supporting plate 25 is secured to casing member 20 by screws 26. This member 25 carries a bearing 27 which constitutes one of the two bearings for the shaft 12.

A second casing member is generally designated by the reference numeral 30, this casing member is of relatively heavy construction, preferably being formed by casting. This casing member 30 comprises an annular ring 31 and a web portion 32 extending diametrically across the member. Located within the web portion 32 is a bearing member 33, which forms the other bearing for shaft 12. At the upper and lower extremities of the casing member 30, a bracket member 35 is provided. These bracket members form a continuation of the web portion 32. The bracket portions are provided with perforations 36 which are adapted to receive fastening means to support the motor from a stationary object. The annular portion 31 is of approximately the same but slightly less diameter than the internal diameter of the larger portion 23 of casing member 20 so that casing member 30 telescopingly fits within casing member 20 with a very close fit. By reason of this close fit, it is impossible for there to be any lateral displacement of the casing members and consequently of the bearings. A gasket 37 of cork or other suitable fibrous material is interposed between the annular member 31 and the core 10. Since the core at its other side rests against the internal shoulder formed by portion 24 of casing member 20, it will be readily seen that the clamping together of casing members 20 and 30 will cause the core 10 to be yieldably clamped between these two members. The member 30 is provided with lugs 38 for clamping purposes as will be more apparent from the next paragraph.

A ring 40, the form of which is best shown in Figure 2, surrounds the casing member 20. This ring is provided with lugs 41 which have screw threaded openings 42 therein. The ring 40 bears against the external shoulder formed by portion 24 of the casing member 20. Spacing sleeves 44 of predetermined length are secured between the lugs 38 and the lugs 41 of annular ring 40. Screws 45 extend through the lugs 38 and the sleeves 44 and are threaded into the screw threaded openings 42. Lock washers 46 or other similar devices are preferably interposed between the heads of the screws and the lugs 38. It will be readily seen that the screws 45 serve to draw the casing members 20 and 30 together. The spacing thereof however is rigidly determined by the length of the spacing sleeves 44. The yieldable gasket 37, at the same time, serves to hold core 10 securely in place and to urge ring 40 against shoulder 24 of casing 20. By reason of the presence of the yieldable fibrous gasket 37, the core is yieldably held in place and at the same time the vibration between the various elements of the core and casing is effectively reduced.

The shaft 12 of the rotor is journaled in the bearings 27 and 33. A sleeve 50 of brass or other suitable material is securely fastened to shaft 12 and serves to limit movement of the rotor and shaft to the left. At the outer end of the shaft 12 a gear 51 is secured, this gear also serving to limit movement of the shaft to the right. It will be readily seen that since the spacing between the members 20 and 30 is rigidly controlled by the length of the sleeves 44, the spacing between bearing members 27 and 33 will likewise be controlled. Moreover, it will be readily seen that by reason of the telescoping character of the two casing parts it is impossible for there to be any appreciable shifting thereof relative to each other in a direction vertical to the shaft. Thus by providing the bearing members in the telescoping bearing portions an extremely simple combined bearing and casing structure is obtained and at the same time a very superior alignment and spacing of the bearings is obtained.

While I have shown a specific embodiment of my invention it is to be understood that this is for purposes of illustration only and that the invention is to be limited only by the scope of the appended claims.

I claim as my invention:

1. In an electric motor, a rotor, a shaft for the same, a core adapted to cooperate with said rotor, a pair of casing members which cooperate to enclose said core and rotor, a bearing member for said shaft in each of said casing members, spacing means of predetermined length, means for rigidly clamping said casing members in assembled relation with the spacing thereof fixed by said spacing means and for yieldably clamping said core within said casing members.

2. In an electric motor, a rotor, a shaft for the same, a core adapted to cooperate with said rotor, a pair of telescoping casing members which cooperate to enclose said core and rotor, a bearing member for said shaft in each of said casing members, spacing means of predetermined length, means for rigidly clamping said casing members in assembled relation with the spacing thereof fixed by said spacing means and for yieldably clamping said core within the larger of said casing members and between said two casing members.

3. In an electric motor, a rotor, a shaft for the same, a core adapted to cooperate with said rotor, a cup shaped casing member surrounding said core and against an inner wall of which said core abuts, a second casing member of smaller overall dimensions and telescopingly fitting within said first casing member, yieldable means interposed between the edge of said second casing member and said core, bearing members for said shaft, one being secured in each of said casing members, spacing means of predetermined length, and clamping means effective to clamp said casing members together with the spacing therebetween determined by said spacing means, said yieldable means being effective to cause said core to be securely clamped between said casing members without affecting the spacing thereof regardless of variations in the thickness of said core.

4. In an electric motor, a rotor, a shaft for the same, a core adapted to cooperate with said rotor, a cup shaped casing member surrounding said core and against an inner wall of which said core abuts, a second casing member of smaller overall dimensions and telescopically fitting within said first casing member, yieldable means of fibrous material interposed between the edge of said second casing member and said core, bearing members for said shaft, one being secured in each of said casing members, spacing means of predetermined length, and clamping means effective to clamp said casing members together with the spacing therebetween determined by said spacing means, said yieldable means being effective to cause said core to be securely clamped between said casing members without affecting the spacing thereof regardless of variations in the thickness of said core.

5. In an electric motor, a rotor, a shaft for the same, a core adapted to cooperate with said rotor, a cup shaped casing member surrounding said core and against an inner wall of which said core abuts, a second casing member of smaller overall dimensions and telescopingly fitting within said first casing member, a yieldable annular gasket interposed between the edge of said second casing member and said core, bearing members for said shaft, one being secured in each of said casing members, spacing means of predetermined length, and clamping means effective to clamp said casing members together with the spacing therebetween determined by said spacing means, said yieldable gasket being effective to cause said core to be securely clamped between said casing members without affecting the spacing thereof regardless of variations in the thickness of said core.

6. In an electric motor, a rotor, a shaft for the same, a core adapted to cooperate with said rotor, a cup shaped casing member surrounding said core and provided with an internal shoulder against which said core abuts, a second casing member of smaller overall dimensions and telescopingly fitting within said first casing member, yieldable means interposed between the edge of said second casing member and said core, bearing members for said shaft, one being secured in each of said casing members, spacing means of predetermined length, lugs on said second casing member, an annular ring surrounding a portion of said first casing member and engaging an external shoulder thereof, and means for clamping said ring and said lugs against said spacing means and thus clamping said casing members together with a fixed spacing between said casing members and hence said bearings.

7. In an electric motor, a rotor, a shaft for the same, a core adapted to cooperate with said rotor, a cup shaped casing member of sheet material surrounding said core and being stepped to provide an external shoulder and an internal shoulder against which said core abuts, a second casing member of relatively heavy construction but of smaller overall dimensions than said first casing member so as to telescopingly fit therein, yieldable means interposed between said second casing member and said core, bearing members for said shaft, one being secured in each of said casing members, spacing members of predetermined length, an annular ring engaging the external shoulder of said first casing member, lugs on said second casing member, and means for clamping said ring and said lugs against said spacing members and thus clamping said casing members together with a fixed spacing between said casing members and hence said bearings, said yieldable means being effective to cause said core to be securely clamped between said casing members without affecting the spacing thereof regardless of variations in the thickness thereof, said second casing member being provided with bracket portions for mounting the motor.

8. In an electric motor, a rotor, a shaft for the same, a core adapted to cooperate with said rotor, a cup shaped casing member of sheet material surrounding said core and being stepped to provide an external shoulder and an internal shoulder against which said core abuts, a second casing member of relatively heavy construction but of smaller overall dimensions than said first casing member so as to telescopingly fit therein, yieldable means of fibrous material interposed between said second casing member and said core, bearing members for said shaft, one being secured in each of said casing members, spacing members of predetermined length, an annular ring engaging the external shoulder of said first casing member, lugs on said second casing member, and means for clamping said ring and said lugs against said spacing members and thus clamping said casing members together with a fixed spacing between said casing members and hence said bearings, said yieldable means being effective to cause said core to be securely clamped between said casing members without affecting the spacing thereof regardless of variations in the thickness thereof, said second casing member being provided with bracket portions for mounting the motor.

9. In an electric motor, a rotor, a shaft for the same, a core adapted to cooperate with said rotor, a cup shaped casing member of sheet material surrounding said core and being stepped to provide an external shoulder and an internal shoulder against which said core abuts, a second casing member of relatively heavy construction but of smaller overall dimensions than said first casing member so as to telescopingly fit therein, a yieldable annular gasket interposed between said second casing member and said core, bearing members for said shaft, one being secured in each of said casing members, spacing members of predetermined length, an annular ring engaging the external shoulder of said first casing member, lugs on said second casing member, and means for clamping said ring and said lugs against said spacing members and thus clamping said casing members together with a fixed spacing between said casing members and hence said bearings, said yieldable gasket being effective to cause said core to be securely clamped between said casing members without affecting the spacing thereof regardless of variations in the thickness thereof, said second casing member being provided with bracket portions for mounting the motor.

10. In an electric motor, a rotor, a shaft for the same, a core adapted to cooperate with said rotor, end bearing plates for supporting said shaft, said end bearing plates being located on opposite sides of said core, yieldable fibrous material interposed between one of said bearing plates and said core, spacing means of predetermined length, means for rigidly clamping said end plates against said spacing means, said yieldable fibrous material serving to cushion vibration between motor parts and to yieldably clamp the core between said end plates without affecting the spacing thereof.

11. In an electric motor, a rotor, a shaft for the same, a core adapted to cooperate with said rotor, a pair of closely fitting telescoping casing members which cooperate to enclose said core and rotor, bearing members for said shaft, one being located in each of said members, and means for clamping said casing members together and said core between said casing members with a fixed spacing between said casing members regardless of the thickness of said core.

12. In an electric motor, a rotor, a shaft for the same, a core adapted to cooperate with said rotor, a pair of closely fitting telescoping casing members which cooperate to enclose said core and rotor, bearing members for said shaft, one being located in each of said members, means for clamping said casing members together and said core between said casing members.

WILLIAM H. EDMONDSON